United States Patent [19]

Kirstein

[11] Patent Number: 5,080,450

[45] Date of Patent: Jan. 14, 1992

[54] HYDRAULIC DUAL-CIRCUIT BRAKE SYSTEM

[75] Inventor: Lothar Kirstein, Ditzingen, Fed. Rep. of Germany

[73] Assignee: Robert Bosch GmbH, Stuttgart, Fed. Rep. of Germany

[21] Appl. No.: 622,684

[22] Filed: Dec. 5, 1990

[30] Foreign Application Priority Data

Feb. 10, 1990 [DE] Fed. Rep. of Germany ....... 4004123

[51] Int. Cl.$^5$ .............................................. B60T 8/40
[52] U.S. Cl. ............................. 303/113 TR; 303/110; 303/116 R
[58] Field of Search ............ 303/116, 110, 115, 113, 303/119, 93; 180/197

[56] References Cited

U.S. PATENT DOCUMENTS

| | | | |
|---|---|---|---|
| 4,416,347 | 10/1983 | Bertling | 303/113 |
| 4,509,802 | 4/1985 | Solleder et al. | 303/110 |
| 4,726,630 | 2/1988 | Krohn et al. | 303/119 |
| 4,818,039 | 4/1989 | Bertling | 180/197 |
| 4,861,118 | 8/1989 | Barckhardt et al. | 303/119 |
| 4,865,397 | 9/1989 | Inoue et al. | 303/119 |
| 4,900,102 | 2/1990 | Jonner et al. | 303/119 |

OTHER PUBLICATIONS

"Kraftfahrtechnisches Taschenbuch"[Automotive Engineering Handbook]VDI-Verlag, 1987.
"Automotive Handbook"(Translation for AR).

Primary Examiner—Robert J. Oberleitner
Assistant Examiner—Lee W. Young
Attorney, Agent, or Firm—Edwin E. Greigg; Ronald E. Greigg

[57] ABSTRACT

A hydraulic dual-circuit brake system with diagonal brake circuit distribution, an anti-lock system ABS and traction control ASR for motor vehicles having a four-channel hydraulic unit with control valves and a return pump. To achieve the ASR function, a third, self-aspirating pump element embodied as a high-pressure pump on the return pump is driven jointly with the return pump, and the wheel brake cylinders of the two driven wheels (HR, HL) are additionally connected—bypassing the control valves—to the third pumping element via a magnetic valve assembly. If at least one of the driven wheels (HR, HL) is spinning, the third pumping element is activated. The magnetic valve assembly is switched over, and the control valve for the slipping driven wheel is switched to "pressure holding". The brake pressure generated by the pumping element is thus fed into the wheel brake cylinder of the spinning driven wheel (HR, HL), and the spinning driven wheel (HR,HL) is slowed down.

16 Claims, 2 Drawing Sheets

HYDRAULIC DUAL-CIRCUIT BRAKE SYSTEM

BACKGROUND OF THE INVENTION

The invention is based on a hydraulic dual-circuit brake system with diagonal brake circuit distribution, an anti-skid or anti-lock system (ABS) and traction control (ASR) for motor vehicles, in particular passenger vehicles, defined hereinafter.

A four-channel hydraulic unit for diagonal brake circuit distribution in dual-circuit brake systems with skid protection, also known as an anti-lock system (ABS), is known from Bosch publication "Kraftfahrtechnisches Taschenbuch" [Automotive Engineering Handbook] published by VDI-Verlag, 1987, pp. 530 and 531. The ABS control valves, embodied as 3/3-way magnetic valves, have three positions. In the first, non-excited position, there is unhindered passage from the master brake cylinder to the wheel brake cylinders, so that at the onset of braking the wheel brake pressure rises. In the second position, excited with half the maximum current, the passage from the master brake cylinder to the wheel brake cylinders is interrupted, so that the wheel brake pressure is kept constant. In the third position, excited with maximum current, the wheel brake cylinders are made to communicate with the return line; the brake fluid flowing out of the wheel brake cylinders per brake circuit is pumped back into the master brake cylinder by the return pump. All the magnetic valves are triggered by an ABS electronic control in accordance with the slip detected at the wheels by means of slip sensors; in general, the magnetic valves for the wheel brake cylinders of the two rear wheels are triggered in common, so that the same brake pressure prevails in both rear wheels. In the return line, small brake fluid reservoirs are typically included, which upon pressure decrease can temporarily hold a volume of approximately 2 cm 3 cm of brake fluid per brake circuit.

German Patent 36 33 687 A1, U.S. Pat. No. 4,818,039, discloses a hydraulic dual-circuit brake system with diagonal brake circuit distribution, an anti-lock system (ABS) and traction control (ASR) for motor vehicles of the type referred to at the outset, in which a four-channel hydraulic unit of this kind is used (see FIGS. 3 and 8 of this reference). To achieve the traction control, the two pressure pistons, embodied as a tandem piston, of an additional brake cylinder are actuated via a piston rod by a spring reservoir, which is relaxed if wheel slip of at least one driven wheel occurs, the tensed restoring spring displacing the pressure pistons. At the same time, the two central valves are switched over either hydraulically (FIG. 3) or electrically (FIG. 8) and block off the two cylinder chambers of the additional brake cylinder from the master brake cylinder. By means of the two pressure pistons, brake pressure is now fed into the wheel brake cylinders of the driven wheels. The electronic control controls the control valves, and the spinning driven wheel is slowed down until it is free of slip. After that, the brake fluid fed into the wheel brake cylinder is pumped back into the cylinder chamber of the additional brake cylinder by the pumping element of the return pump. The tension of the spring reservoir is effected by a low-pressure pump, which pumps brake fluid into the reservoir chamber of the spring reservoir until such time as the spring reservoir piston has reached its terminal position and opens a switch located in the current circuit of the low-pressure pump.

A dual-circuit brake system with a "front/rear" brake circuit distribution, an anti-lock system and traction control is already known from German Patent 30 21 116 A1; in it, the return pump has a total of three separate pumping elements. Two of them serve to pump the brake fluid back out of the wheel brake cylinders into the master brake cylinder in order to reduce the brake pressure during a normal braking event, while the third pumping element assures the supply of brake pressure in traction control. To this end, the third pumping element is connected on the inlet side to the brake fluid reservoir at the master brake cylinder and on the outlet side to a pressure reservoir. The brake fluid pressure built up in the pressure reservoir is present, via a 3/2-way valve with a hydraulic control inlet, at the ABS control valve for the driven rear wheels, which here is embodied as a 3/2-way magnetic valve, this pressure being available such that it is fed into the wheel brake cylinder, in the excited brake pressure reduction position of the ABS control valve. In the braking event, the 3/2-way valve is switched over by the brake pressure generated by the master brake cylinder, such that the communication between the pressure reservoir and the control valve is blocked off. When the brake is not actuated and if slip of at least one of the driven wheels occurs, the control valve is switched over, so that the wheel brake cylinder is connected to the pressure reservoir via the 3/2-way valve. In order that only the driven wheel at which the drive slip has been sensed will be slowed down, a 2/2-way magnetic valve is incorporated between the outlet of the control valve and each wheel brake cylinder. The electronic 20 control switches over the 2/2-way magnetic valve associated with the driven wheel not exhibiting any slip. The wheel brake cylinder of this driven wheel is thus uncoupled from the pressure reservoir, so that the pressure buildup occurs only in the wheel brake cylinder of the driven wheel that is slipping.

OBJECT AND SUMMARY OF THE INVENTION

It is a principal of the invention to provide a hydraulic dual-circuit brake system as defined hereinafter having the advantage that in a dual-circuit brake system with diagonal brake circuit distribution, in which the driven wheels belong to different brake circuits, similar as in a dual-circuit brake system with a "front/rear" brake circuit distribution, in which the driven wheels belong to the same brake circuit, the supply of brake pressure for ASR operation can be achieved at relatively little expense. The third pumping element of the return pump, which element is embodied as a self-aspirating high-pressure pump, feeds directly into the wheel brake cylinders of the driven wheel during ASR operation, via a pressure limiting valve and the magnetic valve assembly. The closed brake circuits, with their well-known reliability, remain unaffected by the integration of the traction control (ASR). The high-pressure pump preferably generates a brake supply pressure only during ASR, and does not intervene in ABS operations. Compared with the known ASR, in a dual-circuit brake system with diagonal brake circuit distribution, in which the supply of brake pressure is effected via an additional brake cylinder, no problems of hysteresis occur, either. The direct feeding of the brake pressure into the wheel brake cylinders in the ASR situation avoids a series circuit of control valves and magnetic valve assembly with the associated known pressure gradient problems.

Supplying brake pressure through the high-pressure pump only upon ASR is achieved, in an advantageous embodiment of the invention, by providing that an electromagnetically actuated reversing valve is connected between the outlet and the inlet of the high-pressure pump; this valve bypasses the pressure limiting valve in its unexcited basic position, and allows it to become operative only in its excited working position. As a result, the high-pressure pump, which is also driven during ABS operation, pumps in a pressure-free loop in the basic position of the reversing valve, and generates the high braking pressure only after a switchover of the reversing valve in traction control (ASR).

The magnetic valve assembly may be realized in the form of two 2/2-way magnetic valves, or one 3/3-way magnetic valve. In both cases, the magnetic valves upon traction control are triggered along with the control valves associated with the driven wheels, and along with the reversing valve by the electronic control, which also switch on the electric motor for driving the high-pressure pump.

In the case of the 3/3-way magnetic valve, a check valve with a predefined opening pressure is suitably disposed between the outlet of the high-pressure pump and the 3/3-way magnetic valve, so that in ABS operation the high-pressure pump will not pump to the 3/3-way magnetic valve, but rather will pump into the pressure-free loop.

The invention will be better understood and further objects and advantages thereof will become more apparent from the ensuing detailed description of a preferred embodiment taken in conjunction with the drawings.

DESCRIPTION OF THE PREFERRED EMBODIMENTS

Figure 1:
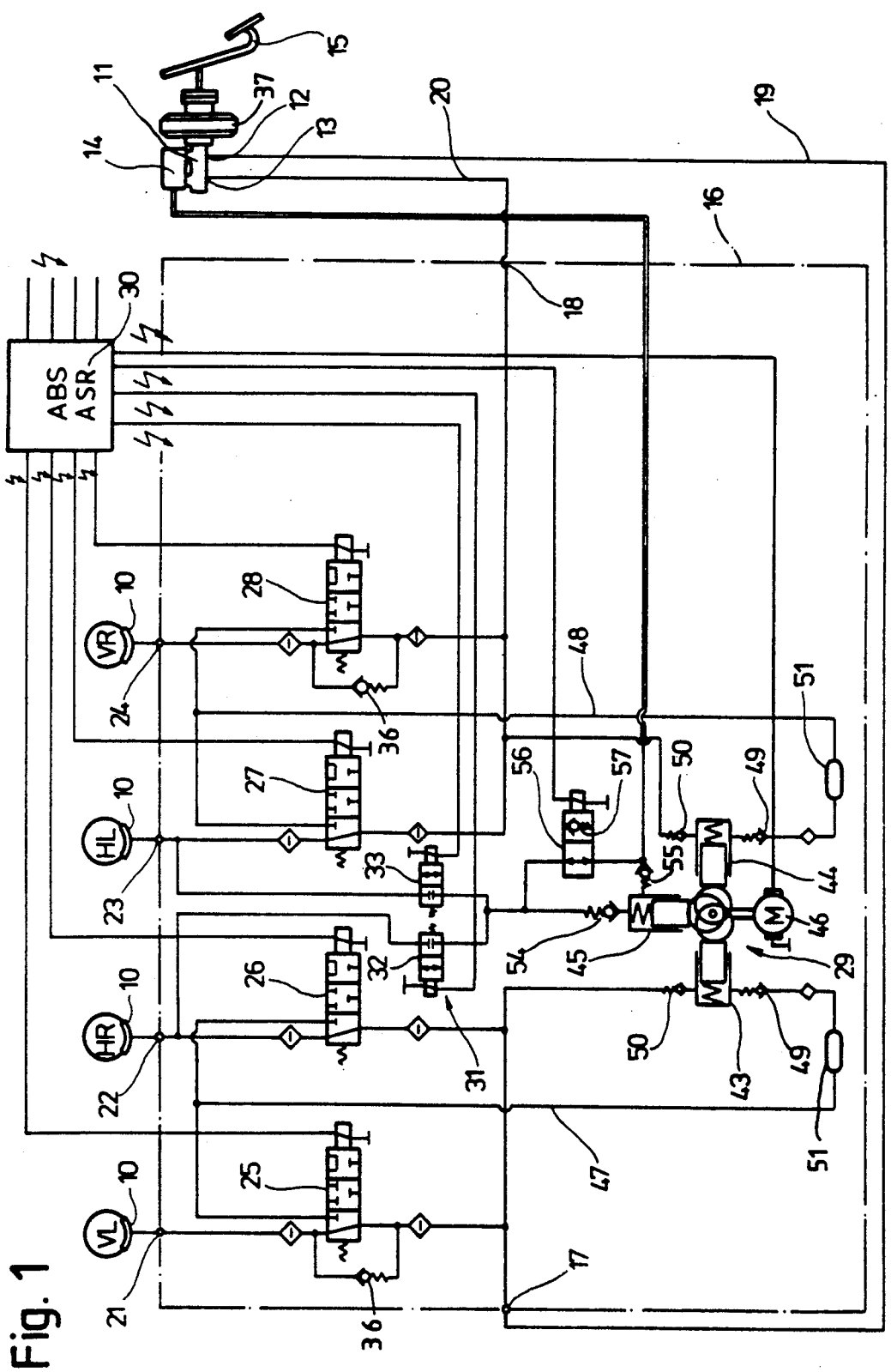
FIG. 1 is a block circuit diagram of a dual-circuit brake system with diagonal brake circuit distribution, an anti-lock system and traction control, for a passenger car.

The hydraulic dual-circuit brake system shown in the block circuit diagram of the drawing, having diagonal brake circuit distribution, an anti-lock system (ABS) and traction control (ASR), is suitable for motor vehicles with front-and rear-wheel drive and will be explained here taking the example of a passenger car with rear-wheel drive. The wheels of the motor vehicle are marked VL (left front), HR (right rear), HL (left rear) and VR (right front). The wheel brake cylinders associated with these wheels are identified by reference numeral 10. The wheel brake cylinders 10 of the wheels VL and HR, on the one hand, and those of the wheels HL and VR, on the other, are each disposed in one brake circuit. In a manner known per se, the dual-circuit brake system includes a master brake cylinder 11, with or without a negative pressure booster 37, which has two separate brake circuit outlets 12, 13 for connection to each of the two brake circuits, and communicates with a brake fluid tank 14. Upon actuation of a brake pedal 15, equally large brake pressure is fed to the brake circuits via the two brake circuit outlets 12, 13.

The dual-circuit brake system also includes a four-channel hydraulic unit 16, which has two inlet channels 17, 18 and four outlet channels 21 to 24. The two inlet channels 17, 18 are connected to the two brake circuit outlets 12, 13 of the master brake cylinder 11 via supply lines 19, 20, while the wheel brake cylinders 10 communicate with the outlet channels 21 to 24 via brake lines. Each outlet channel 21 to 24 is assigned one control valve 25 to 28, embodied as a 3/3-way magnetic valve with spring restoration, and which is controlled in a known manner by an electronic control 30 as a function of the slip sensed at the associated wheel and thus builds up a brake pressure dependent on the wheel slip in the associated wheel brake cylinder 10. Each two control valves 25, 26 or 27, 28 are connected to a separate inlet channel 17 or 18 and thus belong to the same brake circuit, respectively.

The four-channel hydraulic unit 16 also includes a return pump 29, which has two separate pumping elements 43, 44 that are driven in common by one electric motor 46. The pumping elements 43 and 44 serve to pump brake fluid back to the master brake cylinder 11 upon a decrease in brake pressure in the wheel brake cylinders 10, there being one pumping element per brake circuit. To this end, the pump elements 43, 44 are each connected at the inlet side to the two control valves 25, 26 or 27, 28 of the two brake circuits via a one-way pump inlet valve 49 connected in a respective return line 47, 48, and at the outlet side are connected to the associated inlet channel 17 or 18 via a one-way pump outlet valve 50. For holding a volume of fluid from the wheel brake cylinders 10 upon a decrease in brake pressure, low-pressure reservoirs 51 are incorporated into the return lines 47, 48. The control valves 25 to 28 are embodied in a known manner such that in their first, unexcited position there is an unhindered passage of brake fluid from the inlet channel 17 or 18 to the outlet channels 21 to 24. In the second position, excited by half the maximum current, this passage is interrupted by a shifting within the valve, so that the brake pressure fed into the wheel brake cylinders 10 is kept constant. In the third position by further shifting within the valve, excited with maximum current, the outlet channels 21 to 24 and thus the wheel brake cylinders 10 are made to communicate with the return lines 47 and 48, and the brake fluid from the wheel brake cylinders 10 expands into the low-pressure reservoirs 51. For rapid pressure reduction, check valves 36 are connected parallel to the control valves 25, 28 associated with the outlet channels 21, 24 of the wheel brake cylinders 10 of the non-driven wheels VL, VR. For the sake of pressure buildup upon traction control (ASR), to be described hereinafter, these check valves are absent from the control valve 26, 27 for the driven wheels HR, HL.

A third pumping element 45, which is driven in common with the two pumping elements 43, 44 by the electric motor 46, is also disposed on the return pump 29. This third pump element is embodied as a self-aspirating high-pressure pump and is connected on the inlet side to the brake fluid tank 14, via a one-way pump inlet valve 55, and on the outlet side to the outlet channels 22, 23 for the wheel brake cylinders 10 of the driven wheels HR, HL, via a pump outlet valve 54 and a magnetic valve assembly 31. The pump inlet and outlet valves 55, 54 of the high-pressure pump 45 communicate with one another via a reversing valve 56 embodied as a 2/2-way magnetic valve with spring restoration and triggered by the electronic control 30. The reversing valve 56 is embodied such that in its unexcited basic position it enables an unhindered flow in the pump inlet valve and outlet valve 55, 54, and in its excited working position switches on a pressure limiting valve 57 between them. This pressure limiting valve 57 limits the pressure of the high-pressure pump to approximately 100 bar. The pressure limiting valve 57 may—as shown in FIG. 1—be integrated in the reversing valve 56, or be connected parallel to the reversing valve 56. In that case, the reversing valve 56 merely cuts the communication, existing in the currentless position of repose, between the valve inlet and the valve outlet. The magnetic valve assembly 31 comprises two 2/2-way magnetic valves 32, 33 with spring restoration, each of which is associated with one outlet channel 22 or 23 for the wheel brake cylinders 10 of the driven wheels HR and HL. One working connection of each 2/2-way magnetic valve 32 and 33 communicates with the associated outlet channel 22 and 23. In the excited working position of the 2/2-way magnetic valves 32, 33, there is an unhindered passage from the high-pressure pump 45 to the outlet channels 22, 23; in the unexcited basic position, this passage is blocked. The two 2/2-way magnetic valves 32, 33 are triggered by the electronic control 30 whenever wheel slip is sensed at the applicable driven wheel HR, HL.

The mode of operation of the anti-lock system in the dual-circuit brake system described is known and will not be discussed further here. The mode of operation of the traction control is as follows:

If at least one of the two driven wheels HL or HR is spinning, then the electronic control 30 is informed of this via wheel rotation sensors or slip sensors, not shown in detail, of the anti-lock system; the electronic control puts the automatic traction control into operation. A switching signal is issued to the reversing valve 56, which switches on the pressure limiting valve 57 between the pump inlet valve and outlet valve 55, 54 of the high-pressure pump 45. The high-pressure pump 45 is switched on and generates a brake fluid pressure that is limited to approximately 100 bar by the pressure limiting valve 57. This brake fluid pressure is available at the 2/2-way magnetic valves 32, 33. If only one of the two driven wheels, for instance the rear wheel HR, is slipping, then the 2/2-way magnetic valve 32, which is assigned to the outlet channel 22 for the wheel brake cylinder 10 of the slipping driven wheel HR, is switched over by the electronic control 30 and at the same time the control valve 26 associated with this outlet channel 22 is moved into its middle position. Brake pressure is now fed by the high-pressure pump 45 into the wheel brake cylinder 10 of the slipping driven wheel HR. The other 2/2-way magnetic valve 33, which is assigned to the outlet channel 23 for the wheel brake cylinder 10 of the driven wheel HL that is not slipping, remains unaffected by the electronic control 30, as do the other control valves 25, 27, 28. The control of brake pressure at the slipping driven wheel HR is effected by switching the control valve 26 over from its middle position into its end position, and vice versa; in the end position, an overly high brake pressure is reduced via the low pressure reservoir 51. Upon pressure reduction or pressure holding, the 2/2-way magnetic valve 32 is also switched over into its blocking position at the same time.

At the end of traction control, once the spinning driven wheel HR has been slowed down sufficiently that no further drive slip is sensed, the control valve 26 is held in its middle position by the electronic control 30, and the 2/2-way magnetic valve 32 is switched back into its blocking position. At the same time, the excitation of the reversing valve 56 stops, so that the pump inlet valves and outlet valve 55, 54 of the high-pressure pump 45 again communicate with one another, and the high-pressure pump is made pressureless. A braking event during traction control is possible, since the wheel brake cylinders 10 of all the wheels HR, HL, VL, VR are connected to the master brake cylinder 11 via the ABS control valves 25 to 28, and thus the traction control is "overridden" by the ABS control. Thus the braking event always has priority over traction control.

Figure 2:
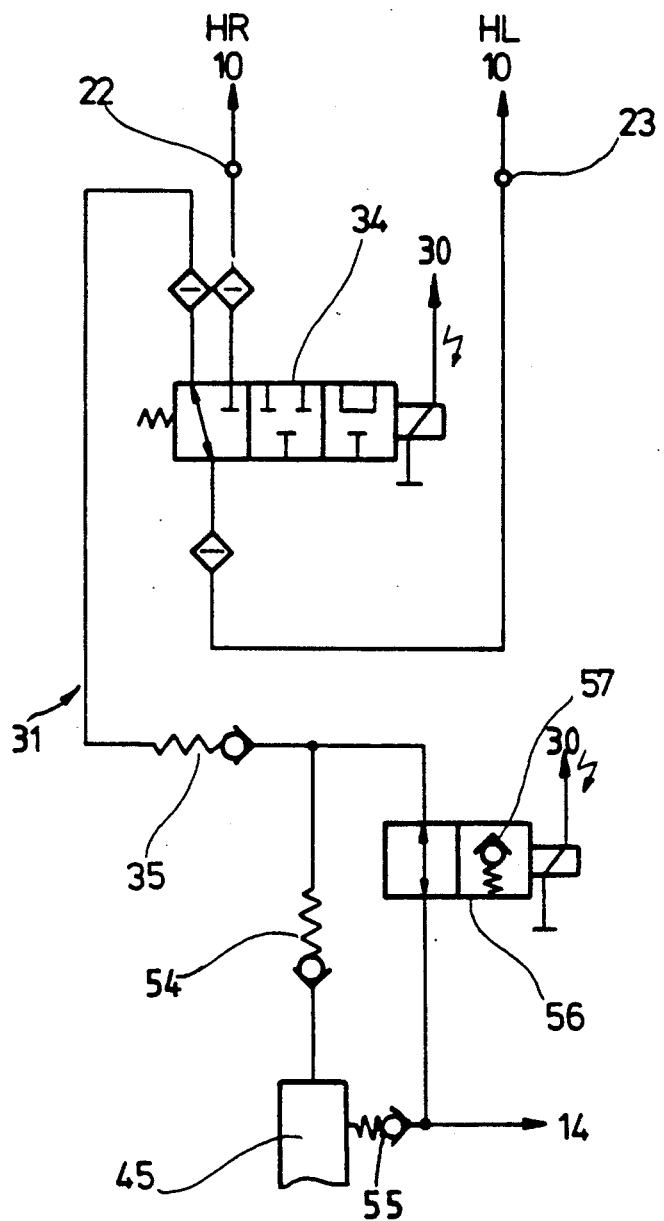
FIG. 2 is a detail of a block circuit diagram of the dual-circuit brake system in accordance with a further exemplary embodiment.

In the modified dual-circuit brake system shown in fragmentary form in the block circuit diagram of FIG. 2, only the magnetic valve assembly 31 is made differently. Instead of the two 2/2-way magnetic valves 32, 33 of FIG. 1, a single 3/3-way magnetic valve 34 with spring restoration in combination with a one-way check valve 35 is used here, and is again controlled by the electronic control 30. Of the three working connections of the 3/3-way magnetic valve 34, the first communicates with the outlet of the pump outlet valve 54 via the check valve 35, which has a flow direction oriented toward the 3/3-way magnetic valve 34; the second communicates with the outlet channel 22 for the wheel brake cylinder 10 of the driven wheel HR; and the third communicates with the outlet channel 23 for the wheel brake cylinders 10 of the driven wheel HL. The 3/3-way magnetic valve 34 is embodied such that the first working connection communicates in the unexcited basic position with the second working connection (outlet channel 22), and in its end position brought about by maximum-current excitation communicates with the third working connection (outlet channel 23). In the middle position, brought about by excitation with half the maximum current, all the working connections are blocked off. The check valve 35 is adjusted for a predetermined opening pressure and assures that during ABS operation the third pumping element (high-pressure pump 45), also driven by the electric motor 46, does not pump to the 3/3-way magnetic valve 34 but rather into the pressureless loop via the reversing valve 56. In the absence of the check valve 35, the 3/3-way magnetic valve 34 would have to be switched over to its middle position in ABS operation.

The mode of operation of the dual circuit brake system during traction control is the same as that described in conjunction with FIG. 1. Depending on which driven wheel HR or HL is exhibiting drive slip, the 3/3-way magnetic valve 34 is either not excited or is excited with maximum current. The brake pressure generated by triggering of the reversing valve 56 by the high-pressure pump 45 thus reaches the wheel brake cylinder 10 of the spinning driven wheel HR or HL, which is slowed down as a result. The control valves 26 or 27 are triggered as described. For maintaining the brake pressure, the 3/3-way magnetic valve 34 is moved into its middle position. The brake pressure reduction is effected via the control valves 26 or 27.

In the case of driven front wheels, the outlet channels 22 and 23 should be connected to the wheel brake cylinders 10 of the front wheels VL and VR, and the outlet channels 21 and 24 should be connected to the wheel brake cylinders 10 of the rear wheels HR and HL.

In a simplified version, the reversing valve 56 can be replaced with a permanently installed pressure limiting valve, which takes on the function of the pressure limiting valve 57. The reversing valve 56 in which the option of short-circuiting the pressure limiting valve 57 in its unexcited basic position exists has the advantage, however, that in ABS operation, in which the return pump 29 is activated, the third pumping element 45 driven with it is made pressureless.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. A hydraulic dual-circuit brake system with diagonal brake distribution for braking the driven and non-driven wheels of a motor vehicle, an anti-lock system (ABS) and traction control (ASR) for the motor vehicle, comprising a master brake cylinder, with two separate brake circuit outlets, for controlling a brake pressure by actuation of a brake pedal; a brake fluid tank communicating with the master brake cylinder; a four-channel hydraulic unit provided with two inlet channels, each connected to one brake circuit outlet of the master brake cylinder, four outlet channels for connection to one wheel brake cylinder of each wheel of the motor vehicle, four 3/3-way magnetic control valves, each connected with one outlet channel and controlled by an electronic control system, for feeding a wheel-slip-dependent brake pressure into the respectively assigned outlet channel, said electronic control system having two control valves operative at a time, belonging to one brake circuit, connected to one inlet channel, an electrically driven return pump having two separate pumping elements, each operative in one brake circuit and each connectable on an inlet side to the outlet channels of the associated brake circuit via the 3/3-way magnetic valves and connected on an outlet side to the associated inlet channel, a third pumping element (45) disposed on the return pump (29) and driven with said return pump for pumping brake fluid back out of the wheel brake cylinders, said third pumping element is embodied as a self-aspirating high-pressure pump connected on an inlet side to the brake fluid tank (14) and connected on an outlet side via a magnetic valve assembly (31) separately with the two outlet channels (22, 23) for the wheel brake cylinders (10) of a set of driven wheels (HR, HL); a pressure limiting valve (57) that opens toward the inlet of the high pressure pump at least during traction control, (ASR) disposed between the inlet and outlet of the high-pressure pump (45); the high-pressure pump (45) activated by the electronic control system (30) upon wheel slip of at least one of the driven wheels (HR, HL) and for feeding pressure into the wheel brake cylinders (10) of the slipping driven wheel (HR, HL) the electronic control system (30) triggers the magnetic valve assembly (31) and the control valve (26, 27), assigned to the outlet channel (22, 23) for the wheel brake cylinder (10) of the slipping driven wheel (HR, HL).

2. A brake system as defined by claim 1, in which a reversing valve (56) is connected by one working connection to the inlet of the high-pressure pump (45) and by another working connection to the outlet of the high-pressure pump (45) and is embodied such that the pressure limiting valve (57) is bypassed in an unexcited basic position and is operative in an excited working position.

3. A brake system as defined by claim 1, in which the valve assembly (31) has two 2/2-way magnetic valves (32, 33), one working connection which communicates with the outlet of the high-pressure pump (45) a second and third working connection which communicate each with one outlet channel (22, 23) for the wheel brake cylinders (10) of the driven wheels (HR, HL); the 2/2-way magnetic valves (32, 33) are embodied such that the working connections communicate with one another in an excited valve working position and are disconnected from one another in an unexcited basic valve position; and the electronic control system (30) triggers whichever valve of the two 2/2-way magnetic valves (33, 34) is assigned to the outlet channel for the wheel brake cylinders (10) of the slipping driven wheel.

4. A brake system as defined by claim 2, in which the valve assembly (31) has two 2/2-way magnetic valves (32, 33), one working connection which communicates with the outlet of the high-pressure pump (45) a second and third working connection which communicate each with one outlet channel (22, 23) for the wheel brake cylinders (10) of the driven wheels (HR, HL); the 2/2-way magnetic valves (32, 33) are embodied such that the working connections communicate with one another in the excited valve working position and are disconnected from one another in the unexcited basic valve position; and the electronic control system (30) triggers whichever valve of the two 2/2-way magnetic valves (33, 34) is assigned to the outlet channel for the wheel brake cylinders (10) of the slipping driven wheel.

5. A brake system as defined by claim 1, in which the valve assembly (31) has one 3/3-way magnetic valve (34); with working connections wherein, a first working connection communicates with the high-pressure pump (45), and a second and a third working connections each communicate with one of the outlet channels (22, 23) for the wheel brake cylinders (10) of the driven wheels (HR, HL); the valve assembly 3/3-way magnetic valve (34) is embodied such that in an unexcited basic valve position the first working connection communicates with the second working connection, in an end valve position excited by a maximum current the first working connection communicates with the third working connection, and in a middle position excited by half the maximum current, the first working connection is disconnected from both said second and third working connections; and the electronic control system (30) shifts the valve assembly 3/3-way magnetic valve (34) into a switching position in which the outlet channel (22, 23) for the wheel brake cylinder (10) of the slipping driven wheel (HR, HL) is connected to the high-pressure pump (45).

6. A brake system as defined by claim 2, in which the valve assembly (31) has one 3/3-way magnetic valve (34); with working connections wherein a first working connection communicates with the high-pressure pump (45), and a second and a third working connections each communicate with one of the outlet channels (22, 23) for the wheel brake cylinders (10) of the driven wheels (HR, HL); the valve assembly 3/3-way magnetic valve (34) is embodied such that in an unexcited basic valve position the first working connection communicates with the second working connection, in an end valve position excited by a maximum current the first working connection communicates with the third working connection, and in a middle position excited by half the maximum current, the first working connection is disconnected from both said second and third working connections; and the electronic control system (30) shifts the valve assembly 3/3-way magnetic valve (34) into a switching position in which the outlet channel (22, 23) for the wheel brake cylinder (10) of the slipping driven wheel (HR, HL) is connected to the high-pressure pump (45).

7. A brake system as defined by claim 5, in which the valve assembly (31) has a check valve (35), which is disposed, with a blocking direction toward the high-pressure pump (45), between the outlet of the high-pressure pump and the first working connection of the valve assembly 3/3-way magnetic valve (34).

8. A brake system as defined by claim 6, in which the valve assembly (31) has a check valve (35), which is disposed, with a blocking direction toward the high-pressure pump (45), between the outlet of the high-pressure pump and the first working connection of the valve assembly 3/3-way magnetic valve (34).

9. A brake system as defined by claim 1, in which the inlet and outlet of the high-pressure pump (45) are followed and preceded, respectively, in each case in terms of the flow direction of the pressure fluid, by a one-way valve (54, 55).

10. A brake system as defined by claim 2, in which the inlet and outlet of the high-pressure pump (45) are followed and preceded, respectively, in each case in terms of the flow direction of the pressure fluid, by a one-way valve (54, 55).

11. A brake system as defined by claim 3, in which the inlet and outlet of the high-pressure pump (45) are followed and preceded, respectively, in each case in terms of the flow direction of the pressure fluid, by a one-way valve (54, 55).

12. A brake system as defined by claim 4, in which the inlet and outlet of the high-pressure pump (45) are followed and preceded, respectively, in each case in terms of the flow direction of the pressure fluid, by a one-way valve (54, 55).

13. A brake system as defined by claim 5, in which the inlet and outlet of the high-pressure pump (45) are followed and preceded, respectively, in each case in terms of the flow direction of the pressure fluid, by a one-way valve (54, 55).

14. A brake system as defined by claim 6, in which the inlet and outlet of the high-pressure pump (45) are followed and preceded, respectively, in each case in terms of the flow direction of the pressure fluid, by a one-way valve (54, 55).

15. A brake system as defined by claim 7, in which the inlet and outlet of the high-pressure pump (45) are followed and preceded, respectively, in each case in terms of the flow direction of the pressure fluid, by a one-way valve (54, 55).

16. A brake system as defined by claim 8, in which the inlet and outlet of the high-pressure pump (45) are followed and preceded, respectively, in each case in terms of the flow direction of the pressure fluid, by a one-way valve (54, 55).

* * * * *